United States Patent
Jorn

[15] 3,666,301
[45] May 30, 1972

[54] PIVOT OR SUPPORT SLEEVE WITH RESILIENT LAYER

[72] Inventor: Raoul Jorn, D-8992 Hengnau, Post Wasserburg A. B., Germany

[22] Filed: Nov. 2, 1970

[21] Appl. No.: 86,167

[30] Foreign Application Priority Data

Nov. 4, 1969 Germany .................P 19 55 308.3

[52] U.S. Cl. ...........................................287/85 R, 267/57.1
[51] Int. Cl. ............................................................F16b 7/00
[58] Field of Search..................287/85 R; 267/57.1, 57.1 A, 267/153, 154; 29/450, 149.5 NM, 508

[56] References Cited

UNITED STATES PATENTS

| | | | |
|---|---|---|---|
| 2,251,453 | 8/1941 | Jackson | 29/149.5 NM |
| 2,233,110 | 2/1941 | Piron | 267/63 A |
| 1,958,141 | 5/1934 | Haushalter | 29/149.5 NM |
| 2,324,083 | 7/1943 | Holmes | 29/149.5 NM |
| 2,069,270 | 2/1937 | Piron | 287/85 R |
| 3,147,963 | 9/1964 | Frazier | 287/85 R |
| 2,267,312 | 12/1941 | Smith | 267/57.1 |

*Primary Examiner*—Andrew V. Kundrat
*Attorney*—Karl F. Ross

[57] ABSTRACT

A pivot or support sleeve has an elastomeric cushion and consists of an inner metal tube or pin and two outer metallic half shells between which is disposed a rubber layer vulcanized to the metal bodies with which it is concentric.

4 Claims, 8 Drawing Figures

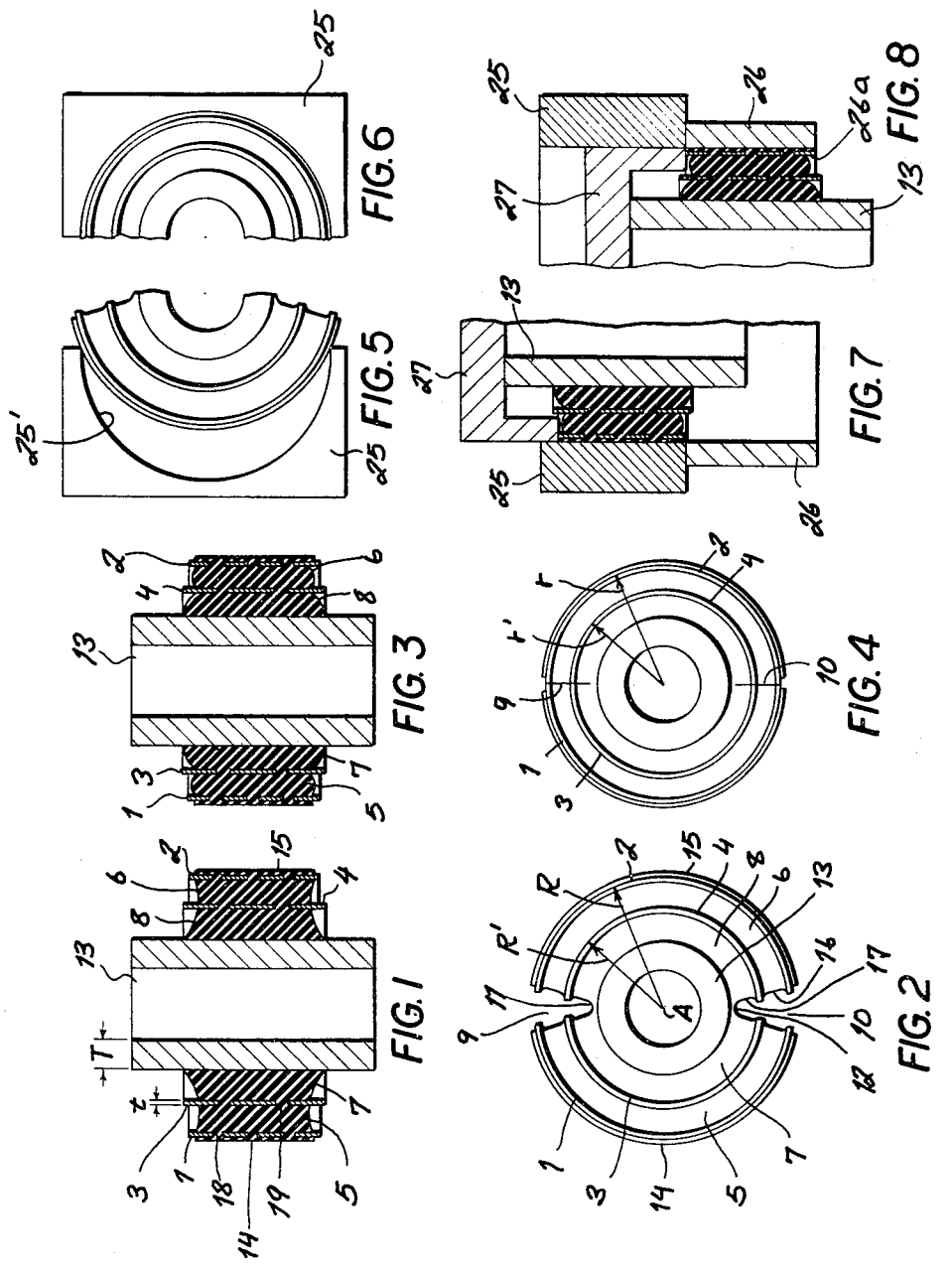

PIVOT OR SUPPORT SLEEVE WITH RESILIENT LAYER

FIELD OF THE INVENTION

The present invention relates to a pivot or support bushing and, more particularly, a pivot, hinge or link arrangement provided with a cushion between a pair of metallic members.

BACKGROUND OF THE INVENTION

Sleeves provided with cushion layers between an outer metal body and an inner metal body to which the elastomeric cushion is bonded, have been used heretofore in a number of applications wherein some degree of relative movement of the inner and outer metal bodies is desirable, but where shock or force transmission between the two is to be limited. For example, such bushings may be provided as anchorages for torsion bar springs in the suspense of automotive vehicles, for the steering pins and pivots of the steering linkage of automotive vehicles, especially light and heavy trucks, railroad trains and the like, as supports for various suspension elements, e.g. the brackets engaging the leaf springs of an automotive vehicle or railroad car suspension and, in general, in all cases wherein relative movement within the elastic limit of the cushion layer is to be permitted between the inner and outer member in which such relative movement may have two or more degrees of freedom and in which an elastic force transmission is required between the inner and outer members. Such "flexible couplings" are not satisfactory for use in place of Cardan or universal joints.

For the most part, coaxial flexible couplings of this type comprise a rigid inner metallic tube and an outer metallic tube, generally consisting of two metallic half shells, a rubber layer which is vulcanized to both the inner and outer metallic body. The half shells are split in such prior art systems to permit torque transmission between the inner and outer bodies through the rubber or elastomeric layer. Upon assembly, the outer half shells, whose axes of curvature were originally eccentric with respect to the axis of the inner metallic body or tube, are radially pressed together to provide a prestress in the rubber layer in the form of a precompression. The compressive prestress increases the useful life of this element of the assembly which is under considerable shear stress, since the molecular chains of the rubber are thereby oriented. Morever, the adhesion of the elastomeric layer to the metal bodies on either side thereof is increased as a result of the increased frictional interrelationship.

The disadvantage of these arrangements, however, resides in the fact that the compressive prestress cannot be generated uniformly over the entire circumference of the sleeve; in fact, the compressive prestress drops to zero in the region of the gaps mentioned earlier.

Moreover, the forms, molds or dies used to produce the assembly and for the vulcanization thereof, are expensive and complicated to manufacture since the outer half shells are disposed eccentrically with respect to the inner member or core.

Also, it has been found to be disadvantageous to use such bushings or sleeve arrangements because adjusting springs or the like were frequently required to effect the desired degree of torque between the outer shell and the core or inner body where thick cushion layers were provided if rupture of these layers was not to occur. The tolerances of the gaps between the half shells were required to be small so that a precise prestress could be provided. To increase the stiffness of the rubber cushion, the resistance to tearing and the torque transmission between the inner and outer metallic members, it has been proposed to provide one or more intermediate shells of metal bonded to the elastomeric material coaxially with respect to the inner and outer members in the prestressed state of the assembly. Prior-art systems of this type, however, had the disadvantage that precompression or prestress of the portion of the elastomeric layer between the outer shell and the intermediate shell could be effected by closing the gap in the outer shell but would not suffice to compress the layer between the intermediate shell and the inner or core member. Systems which widened the inner or core member outwardly to compress this latter layer, were found to be unsatisfactory.

OBJECTS OF THE INVENTION

It is therefore the principal object of the present invention to provide a pivot or support bushing of the general character described, i.e. comprising an inner metallic member, an outer metallic member and an elastomeric cushion between these members which will overcome the disadvantages enumerated above.

It is another object of the invention to provide a cushioned or resilient bushing of the character described which has a large angle of deflection (i.e. permits the inner and outer members to deflect with respect to one another upon resilient distortion of the cushion).

Still another object of the invention is to provide an improved cushion bushing of the character described having a high spring constant in the radial direction and which is capable of withstanding large forces applied in this direction.

Also, it is an object of the invention to provide a resilient bushing of the character described in which the cushion may be held under a uniform prestress all around the circumference of the bushing.

Finally, but not least, it is an object of the invention to provide a resilient bushing, sleeve or support arrangement of the character described which will not manifest localized strain in excess of the mean stress about the circumference of the bushing and which can be produced in an economic and efficient manner while having a simple and inexpensive construction.

SUMMARY OF THE INVENTION

These objects and others which will become apparent hereinafter are attained, in accordance with the present invention, in an elastomer metal cushion bushing, sleeve or ring comprising an inner relatively massive (thick-wall) metallic core member, e.g. an inner sleeve or pin, a pair of outer metallic half shells of lesser thickness, an elastomeric layer between the inner or core member and the thin-wall outer member constituted by the half shells and bonded thereto, and an intermediate thin-wall metallic member embedded in the elastomeric cushion and disposed between the inner and outer members in spaced relationship thereto. The intermediate member comprises a pair of half shells adapted to form an intermediate ring upon stressing as will be apparent hereinafter and vulcanized or otherwise bonded to the elastomeric layer.

An essential feature of the invention resides in the fact that the metallic outer member and the metallic inner member are constituted as thin easily deformable sheet-metal bodies and, prior to use of the assembly, are centrally disposed with respect to the axis of the inner member.

Between the sections of the outer and intermediate members, therefore, there are provided gaps (interruptions of the circumference) which may be aligned in the radial direction and may register with a corresponding gap in the elastomeric layer. The outer and intermediate members are coaxial with the inner member prior to application of the prestress.

The gaps, advantageously, are of V-configuration, i.e. widen radially outwardly with the apex of the V being formed by a ligature of the elastomeric material immediately surrounding the inner member. The gap may be of uniform cross-section all along the longitudinal or axial dimension of the sleeve. The gaps are, moreover, so dimensioned that, upon forcible insertion of the sleeve in a supporting eye (i.e. a body having a cylindrical opening of smaller diameter than the outer dimensions of the uncompressed sleeve) the outer member, the portion of the elastomeric layer between the outer member and the intermediate member, the intermediate member, and the portion of the elastomeric member between the intermediate layer and the inner member will be compressed radially inwardly against the inner member in a fully uniform manner and the radii of curvature of the sections of the outer and intermediate members will be reduced.

Depending upon the extent of deformation, the existence of any radial precompression or the magnitude of such precompression may be determined. In the contracted state of the assembly, however, when the latter is inserted forcibly in a bushing to maintain compression a cross-section transverse to the axis reveals all of the members and the intermediate elastomeric layers to be of circular configuration and centered upon the axis.

The precompression, if provided, is distributed over the entire circumference of each of the members substantially uniformly and is also distributed equally to the two rubber layers. The thickness of the layers in the completed state is determined partly by elastic and partly by plastic deformation of the metal shells and is a consequence in the reduction of the radial thickness to the same extent or along the circumference. Consequently, large angular deflections and large radial forces can be absorbed by the system for prolonged periods with a minimum of creep, even when the forces are applied to the region formerly occupied by the V-shaped gaps.

The bushing can be made in a simple manner and, once the vulcanized assembly is formed, can be mounted and compressed in a single step. This step is, of course, the forcible insertion of the bushing into an opening of smaller diameter which serves to compress the rubber layers to the desired degree of precompression and to mount the bushing in the structure for which it was intended. Since the outer and intermediate shells have thin walls and are readily deformable, it is possible to tolerate relatively large deviations in the diameter of the receiving hole and in the outer dimensions of the sleeve. It has also been found to be desirable, when greater stiffness in the radial direction is desired, to provide two or more intermediate members in radially spaced relationship.

According to another feature of this invention, the outer member (metallic shell) is provided with a thin rubber film or coating which may be vulcanized to the metal and, moreover, may be vulcanized to the adjacent elastomeric layer through openings provided in the outer shell. This rubber film may have a thickness of several millimeters (e.g. 1 – 10 mm) and can be applied to the outer surface of the outer shell member after the latter has been coated with an adhesive during the vulvanization step. The intermediate and outer members, moreover, may be composed of perforated sheet metal to permit a monolithic bond between the elastomeric (vulcanizable rubber) layers on opposite sides of each of these members. The external coating on the assembly increases the frictional interengagement between the receiving hole and outer member and permits effective force transmission between them so that adjusting springs are not required. The film also prevents the outer metallic member from rusting to the receiving body.

According to another feature of this invention, the elastomeric layers define the V-profile gaps prior to compression of the assembly or set-back from the edges of the outer and intermediate shells along this gap but are deformed into contact with the opposing elastomeric layer upon radial compression so that surface-to-surface contact exists between the elastomeric portions on opposite sides of the gap, the metallic shells being contiguous. The elastomeric material does not interfere with a contiguous engagement of the sections of each member. As a result, the entire assembly has the loading properties of a closed-circumference pipe or tube.

DESCRIPTION OF THE FIGURES

The above and other objects, features and advantages of the present invention will become more readily apparent from the following description, reference being made to the accompanying drawing in which:

FIG. 1 is an axial cross-sectional view through a resilient bushing according to the present invention, prior to compression;

FIG. 2 is a plan view of the bushing of FIG. 1;

FIG. 3 is an axial cross-sectional view of the bushing after compression;

FIG. 4 is a plan view of the system of FIG. 3;

FIG. 5 is a fragmentary plan view illustrating the position of the bushing in the compressing device;

FIG. 6 is a view similar to FIG. 5, after compression;

FIG. 7 is a fragmentary longitudinal section illustrating the position of the sleeve prior to its introduction into the mounting eye; and FIG. 8 is a view similar to FIG. 7 illustrating the position assumed by the sleeve thereafter.

SPECIFIC DESCRIPTIONS

FIGS. 1 and 2 show a sleeve according to the present invention after vulcanization and prior to the compression of the system. The sleeve comprises an inner or core member 13 having a thickness T which is much greater than the thickness $t$ of a pair of shell members 1, 2 and 3, 4, the latter being composed of sheet metal which is readily deformable, the radial deforming pressures being incapable of materially deforming the member 13. The member 13, here shown to be a sleeve, may also be a solid stud or pin.

The outer half shells 1 and 2 have radii of curvature R centered upon the axis A of the inner member 13 and are radially spaced from corresponding intermediate half shell members 3 and 4 of a radius of curvature R'. R and R' are respectively greater than $C/2\pi$ and $C'/2\pi$ where C and C' are the sums of the arc-segment lengths as tended by the half shells in the uncompressed states.

Between the metal parts 1, 2 and 3, 4, there are disposed elastomeric layers 5 and 6 which are rubber half shells vulcanized to the sheet-metal members 1 – 4. At 7 and 8, there are provided segmental elastomeric layers vulcanized between the intermediate member 3, 4 and the core member 13. An important feature of the invention is that the axes of the half shells 1, 2 and 3, 4, as well as of the rubber layers lying therebetween, coincide with the axis A of the sleeve 13 even in the uncompressed state of the system. Between the half shells, I provide V- profile longitudinally extending grooves or gaps 9 and 10 at the verticles of which ligatures 11 and 12 of elastomeric material bond the layers 7 and 8 together. The edges of the elastomeric layers which define the gap and represented at 16 and 17, are set back from the edges of the metallic members 1 – 4 (see FIG. 2). Similarly, the end faces of the rubber layers are set back from the edges of the members 1 – 4 with a concavity as represented in FIG. 1.

Upon the outer member 1, 2, there are provided thin rubber films 14 and 15 which are vulcanized to the metal half shells 1, 2 and to the inwardly opposed layers 5, 6 through perforations 18 uniformly distributed over the half shells 1 and 2. The half shells 3 and 4 are likewise provided with perforations 19 through which the rubber layers 5, 6 or 7, 8 are vulcanized to one another.

In FIGS. 3 and 4, I show the sleeve after radial compression, the half shells 1 and 2 being brought into contiguous relationship by reduction of the radius of curvature under radial pressure while the inward force applied is transmitted by the outer elastomeric layers 5 and 6 to the intermediate shell 3, 4. The intermediate half shells are also brought into contiguous relation. The half shells 1 and 2 thus form an outer cylindrical sleeve of circumference C and a radius of curvature $r = C/2\pi$, likewise the inner shell 3, 4 is cylindrical with a circumference C' and a radius of curvature $r' = C/2\pi$. The axes of these sleeves still coincide with the axis A of the inner member 13. The deformation of the metal sleeves is in part elastic and in part plastic deformation and the gaps 9 and 10 are therefore closed. The radial compression of the rubber layers 5 – 8 closes the end flanks 16 and 17 of the latter to bulge outwardly and engage at opposed end flanks as as shown at FIG. 4 so that the assembly has a fully closed tube or ring cross-section. The compression also results in a outward bulge in the axial flanks of the layers 5 – 8 as shown in FIG. 3.

In FIG. 5, I have illustrated a clamping member 25, in the form of one of a pair of jaws whose recess 25' has the radius of curvature r, the jaws being brought together to compress the assembly as shown in FIG. 6. The gaps 9 and 10 are thereby closed. Once the sleeve assembly is clamped in the jaws, the compressing device can be aligned with an eye 26 (FIG. 7) whereupon a ram 27 can drive the compressed sleeve into the eye and position the sleeve as desired. From FIG. 8 it may be seen that the eye 26 has a cylindrical bore or hole 26a with a radius of curvature r, and an axis coinciding with that of the sleeve 13. The axial length of the outer shell 1, 2 coincides with the axial length of the retaining eye 26.

The improvement described and illustrated is believed to admit of many modifications within the ability of persons skilled in the art, all such modifications being considered within the spirit and scope of the invention except as limited by the appended claims.

I claim:
1. A resilient bushing, comprising:
   a relatively massive cylindrical metallic inner member defining an axis;
   a relatively thin sheet-metal outer member comprising a pair of half shells centered on said axis and separated from one another by a peripheral gap;
   a respective layer of elastomeric material bonded to each of said half shells and to said inner member; and
   an intermediate thin sheet-metal member comprising a pair of half shells peripherally spaced apart along said gap and intermediate said outer and inner members while being bonded to the respective layer, the half shells of said intermediate member being centered on said axis whereby radial compression of said outer and inner members forces the half shells thereof into contiguous relation to produce closed sleeves coaxial with one another and centered on said axis, the bushing being formed with a pair of outwardly diverging V-profile grooves extending longitudinally along said members and defining said gaps, each said layer comprising an elastomeric body between the half shells of the outer and intermediate members and an elastomeric body between each intermediate half shell and said inner member, said intermediate half shells being provided with perforations filled with the elastomeric material of said bodies.

2. The bushing defined in claim 1, further comprising an elastomeric film on said outer member and bonded thereto.

3. The bushing defined in claim 2 where said outer member is provided with perforations filled with elastomeric material bridging said film and said bodies.

4. The bushing defined in claim 1 wherein the layers of said half shells have flanks confronting one another across said gaps and set back from the edges of said half shells defining said gaps.

* * * * *